J. H. FARMER.
SAFETY LOCKING DEVICE FOR MOTOR VEHICLES.
APPLICATION FILED MAY 10, 1920.
1,388,417.
Patented Aug. 23, 1921.
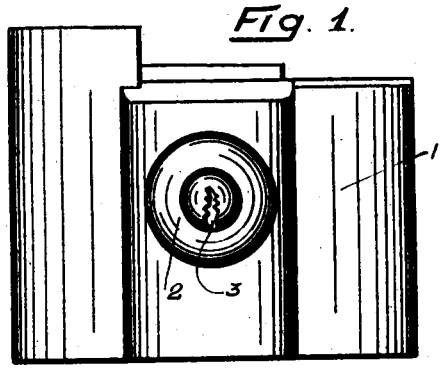
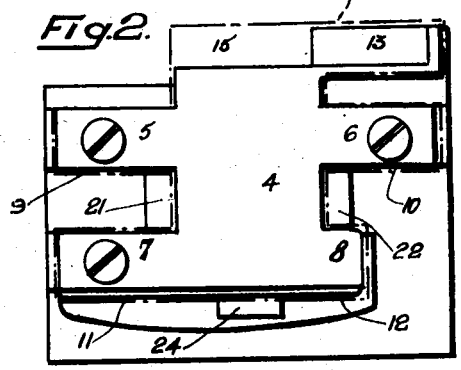
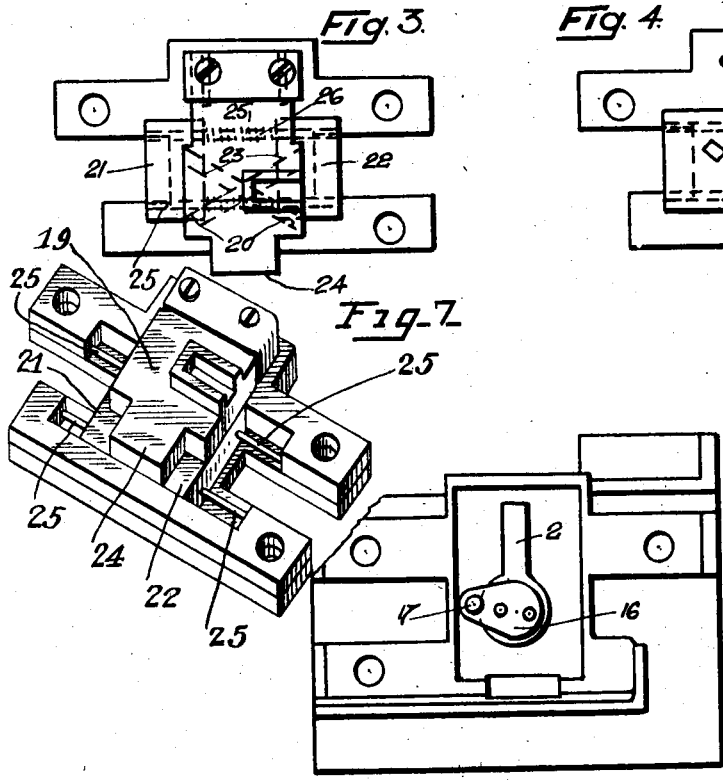
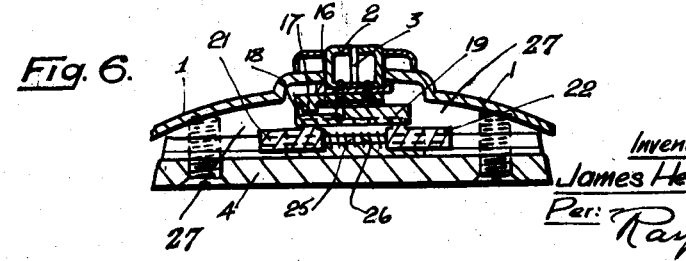
Inventor.
James Henry Farmer.
Per: Rayner & Co
Attorneys.

UNITED STATES PATENT OFFICE.

JAMES HENRY FARMER, OF HACKNEY, LONDON, ENGLAND.

SAFETY LOCKING DEVICE FOR MOTOR-VEHICLES.

1,388,417. Specification of Letters Patent. Patented Aug. 23, 1921.

Application filed May 10, 1920. Serial No. 380,184.

*To all whom it may concern:*

Be it known that I, JAMES HENRY FARMER, subject of the King of Great Britain and Ireland, and resident of 50 Benyon road, Southgate Road, Hackney, in the county of London, England, have invented certain new and useful Improvements in Safety Locking Devices for Motor-Vehicles, of which the following is a specification.

My invention is for a new or improved safety locking device for motor vehicles of the type employing a change speed lever working over a change gate and associated with a gear box.

The object of my invention is to provide a safety locking device whereby the change speed lever is effectively held when desired in its neutral or disengaged position so that the driving gears are out of mesh in the gear box and the engine may be run without transmission so that the vehicle may remain at a standstill.

In the majority of motor vehicles employing a hand operated change speed lever working in a change gate the latter is provided with a neutral or free engine position and with a number of traverses or slots representing the different speed ratios and a reverse into any of which the lever is alternately moved and held according to the speed desired and other circumstances, and these traverses or slots are usually so arranged that they communicate one with the other only by way of the neutral position, the arrangement being such that the lever must be always moved into neutral or free engine position before any speed change can be effected.

My invention comprises a lock formed to fit into the slots in the gate in which the change speed lever operates. The lock is provided with sliding bolts arranged to engage with the projecting portions of the gate so as to secure it in position therein. The lock is so arranged to fill the apertures in the gate with the exception of a position for the reception of the change speed lever so as to retain this in the neutral or free position in which none of the gears are in mesh.

When it is desired to lock the change speed lever in position the lever is moved to the neutral position and the lock is brought into position in the slots of the gate so as to close these slots and retain the lever in the neutral position. The lock is secured in position by shooting the bolts therein which are adapted to be operated by means of a suitable key and which engages under projecting parts of the gate. The lock may be suitably shaped for use with various types of change speed mechanism having either 3 or 4 speeds and reverse being shaped to fit the gate employed in either type of gear and so arranged as to leave a space for the reception of the change speed lever when it is in the neutral position.

When the lock is secured in position in the gate the change speed lever cannot be moved to bring any of the gears into operation as the lock itself fills up the various slots in the gate and prevents the lever from being brought into position to engage the gears. The lock may be provided with a pair of sliding bolts adapted to move outwardly in opposite directions and a third bolt to move in a direction at right angles to the first two. The bolts may be operated through the medium of a key acting upon the single transverse bolt while the other two bolts may be operated from this single bolt through the medium of pins and inclined slots or other suitable means.

In order that my invention may be more readily understood reference is made to the accompanying sheet of illustrative drawings in which:—

Figure 1 is a front elevation of my improved locking device for the change speed gears of motor vehicles.

Fig. 2 is a rear view of same showing the contour of the change speed gate in dot and dash lines.

Fig. 3 is an elevation showing the sliding bolts.

Fig. 4 is a similar view with the transverse bolt removed.

Fig. 5 is a rear elevation of the lock with the sliding bolt mechanism removed, and Fig. 6 is a horizontal section through the complete lock.

Fig. 7 is a view in perspective showing the sliding bolts.

Referring to the drawings the lock comprises a frame or upper portion 1 provided with a suitable lock mechanism 2 having an aperture 3 for the reception of a key of any convenient construction. The back of the frame 1 is provided with ribs 27 which project into the slots and to these ribs by means of screws is secured a plate 4. This plate 4 is shaped with limbs, 5, 6, 7, and 8 to engage in the slots 9, 10, 11 and 12, in the gate of a four speed gear and a projection 13 is also provided to engage in the reverse slot 14 of the gate and the whole shape of the lock is such as to leave a space 15 in the gate to accommodate the change speed lever when this is in the neutral position. The upper curved plate of the frame 1 rests upon the curved upper surface of the gate.

The lock mechanism 2 is provided with a small crank 16 secured at its back and a pin 17 on this crank engages in a slot 18 on the transversely sliding bolt 19. This sliding bolt 19 has two inclined slots 20 in its face for the purpose of operating the oppositely moving bolts 21 and 22 which are provided with pins 23 engaging in these slots so that when the lock mechanism is rotated the crank 16 will turn causing the pin 17 to slide the transverse bolt 19 outwardly so that its end 24 projects and engages under the portion of the gate in which the change speed lever works. At the same time the two sliding bolts 21 and 22 will be caused to move outwardly through the engagement of the pins 23 with the slots 20 in the sliding bolt 19 and these bolts 21 and 22 will also engage under portions of the gate so that the lock will be securely held in position in the gate so as to prevent the change speed lever moving out of the neutral position and thus preventing any of the gears from being brought into operation. By these means it will be impossible to work the vehicle under its own power as no connection can be made between the engine and the driving wheels.

These sliding bolts 21 and 22 are guided on the pins 25 and springs 26 are arranged on these guide pins 25 between the bolts 21 and 22 so as to normally tend to press them apart.

The lock may, if desired, be connected by a suitable short length of chain to some portion of the car so that it will always be retained at hand close to the change speed gate and ready to be inserted and locked in position when it is necessary to leave the car unattended, and thus prevent unauthorized use of the vehicle.

In the drawings is shown a suitable construction of lock for use with a change speed gear, having four forward speed and one reverse. The lock may, however, be suitably shaped for use with change speed gear having three speeds and reverse or other arrangements of gear by merely altering the external shape thereof.

I claim:—

A safety locking device for automobiles comprising a cover plate adapted to fit over the change speed gate, so as to cover all openings except that for the neutral position of the change speed lever, ribs on the under side of said plate engaging in said openings, a supporting plate secured to the under side of said ribs and shaped to pass through said openings, a lock carried by said cover plate, a crank operated by said lock, a transversely sliding bolt mounted in said cover plate, a slot in said bolt, a crank pin on said crank engaging in said slot and adapted to slide said bolt to make it engage with the gate, inclined slots on said transverse bolt, a pair of pins mounted in said supporting plate at right angles to said transverse bolt, a pair of sliding plates mounted on said pins, springs on said pins tending to force said plates apart, projections on said plates engaging in the inclined slots in the transverse bolt whereby when said bolt is moved said plates are forced apart to engage under adjacent portions of the gate.

JAMES HENRY FARMER.